(12) United States Patent
Andre et al.

(10) Patent No.: US 7,119,792 B1
(45) Date of Patent: ***Oct. 10, 2006

(54) CURSOR CONTROL DEVICE HAVING AN INTEGRAL TOP MEMBER

(75) Inventors: Bartley K. Andre, Menlo Park, CA (US); Adam S. Farag, Columbia, IL (US); Abraham S. Farag, Palo Alto, CA (US)

(73) Assignee: Apple Computer, Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/060,712

(22) Filed: Jan. 29, 2002

Related U.S. Application Data

(63) Continuation of application No. 09/482,152, filed on Jan. 12, 2000, now Pat. No. 6,373,470.

(51) Int. Cl.
*G09G 5/08* (2006.01)
(52) U.S. Cl. .................. 345/163; 345/161; 345/167
(58) Field of Classification Search .............. 345/156, 345/161, 163, 166, 167, 169, 157, 164, 165
See application file for complete search history.

(56) References Cited

U.S. PATENT DOCUMENTS

| | | | |
|---|---|---|---|
| 4,866,602 A | 9/1989 | Hall | |
| 4,917,516 A | 4/1990 | Retter | |
| 5,125,077 A | 6/1992 | Hall | |
| 5,179,648 A | 1/1993 | Hauck | |
| 5,237,311 A | 8/1993 | Mailey et al. | |
| 5,339,213 A | 8/1994 | O'Callaghan | |
| 5,414,445 A | 5/1995 | Kaneko et al. | |
| 5,438,331 A | 8/1995 | Gilligan et al. | |
| D362,431 S | 9/1995 | Kaneko et al. | |
| 5,473,343 A | 12/1995 | Kimmich et al. | |
| 5,473,344 A | 12/1995 | Bacon et al. | |
| 5,495,566 A | 2/1996 | Kwatinetz | |
| 5,528,265 A | 6/1996 | Harrison | |
| 5,559,943 A | 9/1996 | Cyr et al. | |
| 5,561,445 A | 10/1996 | Michio et al. | |
| 5,565,887 A | 10/1996 | McCambridge et al. | |
| 5,578,817 A | 11/1996 | Bidiville et al. | |
| 5,585,823 A * | 12/1996 | Duchon et al. ............. 345/163 |
| 5,596,347 A | 1/1997 | Robertson et al. | |
| 5,598,183 A | 1/1997 | Robertson et al. | |

(Continued)

FOREIGN PATENT DOCUMENTS

DE    19722636    12/1998

(Continued)

OTHER PUBLICATIONS

Justin UNM-10 "Bottomless" Scroll Mouse By Gadgetboy Oct. 10, 2001.*

(Continued)

*Primary Examiner*—Richard Hjerpe
*Assistant Examiner*—Jean Lesperance
(74) *Attorney, Agent, or Firm*—Beyer Weaver & Thomas, LLP

(57) ABSTRACT

The present invention provides an improved computer mouse that has a mouse housing having a base member and a top member. The base member is configured primarily to make moving contact with the surface of a computer pad or a table. The top member is an integrated piece having no separate mechanical button disposed thereon. For data selection and command execution, the top member and the base member of the mouse are coupled and engaged in a manner that the entire top member via simple wrist action serves as a button for activating an internal switch to register palm clicking input.

26 Claims, 2 Drawing Sheets

U.S. PATENT DOCUMENTS

| | | | |
|---|---|---|---|
| 5,611,040 A | 3/1997 | Brewer et al. | |
| 5,611,060 A | 3/1997 | Belfiore et al. | |
| 5,633,658 A * | 5/1997 | Ma | 345/161 |
| D382,550 S | 8/1997 | Kaneko et al. | |
| 5,661,505 A * | 8/1997 | Livits | 345/169 |
| D385,542 S | 10/1997 | Kaneko et al. | |
| 5,726,687 A | 3/1998 | Belfiore et al. | |
| 5,751,274 A * | 5/1998 | Davis | 345/157 |
| 5,754,890 A | 5/1998 | Holmdahl et al. | |
| 5,786,818 A | 7/1998 | Brewer et al. | |
| 5,808,602 A | 9/1998 | Sellers | |
| 5,825,353 A | 10/1998 | Will | |
| 5,828,364 A | 10/1998 | Siddiqui | |
| 5,838,304 A | 11/1998 | Hall | |
| 5,841,426 A * | 11/1998 | Dodson et al. | 345/163 |
| D402,281 S | 12/1998 | Ledbetter et al. | |
| 5,883,619 A | 3/1999 | Hoe et al. | |
| 5,907,152 A | 5/1999 | Dändliker et al. | |
| 5,907,318 A * | 5/1999 | Medina | 345/163 |
| 6,005,299 A | 12/1999 | Hengst | |
| 6,031,518 A | 2/2000 | Adams et al. | |
| 6,064,370 A | 5/2000 | Wang et al. | |
| 6,075,533 A | 6/2000 | Chang | |
| 6,084,574 A | 7/2000 | Bidiville | |
| 6,097,372 A | 8/2000 | Suzuki | |
| 6,115,028 A | 9/2000 | Balakrishnan et al. | |
| 6,124,587 A | 9/2000 | Bidiville et al. | |
| 6,128,006 A | 10/2000 | Rosenberg et al. | |
| 6,130,664 A | 10/2000 | Suzuki | |
| 6,163,312 A | 12/2000 | Furuya | |
| 6,166,721 A | 12/2000 | Kuroiwa et al. | |
| 6,179,496 B1 | 1/2001 | Cho | |
| 6,181,322 B1 | 1/2001 | Nanavati | |
| 6,188,389 B1 * | 2/2001 | Yen | 345/163 |
| 6,188,393 B1 | 2/2001 | Shu | |
| 6,191,774 B1 | 2/2001 | Schena et al. | |
| 6,198,473 B1 * | 3/2001 | Armstrong | 345/163 |
| 6,211,861 B1 | 4/2001 | Rosenberg et al. | |
| D442,592 S | 5/2001 | Ledbetter et al. | |
| D443,616 S | 6/2001 | Fisher et al. | |
| 6,243,078 B1 | 6/2001 | Rosenberg | |
| 6,256,011 B1 | 7/2001 | Culver | |
| 6,323,843 B1 * | 11/2001 | Giles et al. | 345/163 |
| 6,333,734 B1 | 12/2001 | Rein | |
| 6,369,797 B1 | 4/2002 | Tyrus | |
| 6,373,470 B1 | 4/2002 | Andre et al. | |
| 6,377,530 B1 | 4/2002 | Burrows | |
| 6,392,634 B1 | 5/2002 | Bowers et al. | |
| 6,429,852 B1 | 8/2002 | Adams et al. | |
| 6,469,693 B1 * | 10/2002 | Chiang et al. | 345/163 |
| 6,587,091 B1 | 7/2003 | Serpa | |
| 6,639,584 B1 | 10/2003 | Li | |
| 6,686,904 B1 | 2/2004 | Sherman et al. | |
| 6,724,817 B1 | 4/2004 | Simpson et al. | |
| 6,727,889 B1 | 4/2004 | Shaw | |
| 6,738,045 B1 | 5/2004 | Hinckley et al. | |
| 6,795,057 B1 | 9/2004 | Gordon | |
| 6,828,958 B1 | 12/2004 | Davenport | |
| 6,844,871 B1 | 1/2005 | Hinckley et al. | |
| 6,844,872 B1 | 1/2005 | Farag et al. | |
| 2001/0043545 A1 | 11/2001 | Aratani | |
| 2002/0030665 A1 | 3/2002 | Ano | |
| 2002/0033848 A1 | 3/2002 | Sciammarella et al. | |
| 2002/0118169 A1 | 8/2002 | Hinckley et al. | |
| 2002/0154090 A1 | 10/2002 | Lin | |
| 2002/0158844 A1 | 10/2002 | McLoone et al. | |
| 2002/0164156 A1 | 11/2002 | Bilbrey | |
| 2002/0180701 A1 | 12/2002 | Hayama et al. | |
| 2003/0076301 A1 | 4/2003 | Tsuk et al. | |
| 2003/0076303 A1 | 4/2003 | Huppi | |
| 2003/0076306 A1 | 4/2003 | Zadesky et al. | |
| 2003/0095096 A1 | 5/2003 | Robbin et al. | |
| 2003/0107551 A1 | 6/2003 | Dunker | |
| 2003/0107552 A1 | 6/2003 | Lu | |

FOREIGN PATENT DOCUMENTS

| | | |
|---|---|---|
| DE | 10022537 | 11/2000 |
| EP | 0 498 540 A2 | 1/1992 |
| EP | 0 880 091 A2 | 11/1998 |
| EP | 0938035 | 2/1999 |
| EP | 1 026 713 A1 | 8/2000 |
| JP | 03/237520 | 10/1991 |
| JP | 11-194863 | 7/1999 |
| JP | 11-194872 | 7/1999 |
| JP | 11-194883 | 7/1999 |
| JP | 2000-215549 | 8/2000 |
| JP | 2001-051790 | 2/2001 |
| WO | WO 94/17494 | 8/1994 |
| WO | WO 98/14863 | 4/1998 |
| WO | WO 99/49443 | 9/1999 |

OTHER PUBLICATIONS

Gadgetboy, "Point and Click with the Latest Mice", www.asia.cnet.com/reviews...are/gadetboy/0,39001770,38023590,00.http, Oct. 10, 2001.

"System Service and Troubleshooting Manual", www.dsplib.com/intv/Master, downloaded Dec. 11, 2002.

Kevin De Meyer, Crystal Optical Mouse, Feb. 14, 2002, Heatseekerz, Web Article 19.

Gadgetboy, "Point and click with the latest mice", website www.asia.cnet.com/review...are/gadgetboy, downloaded Dec. 5, 2001.

"Der Klangmeister," Connect Magazine, Aug. 1998.

Bang & Olufsen Telecom a/s, "BeoCom 6000 User Guide 2000".

Chapweske, Adam, "PS/2 Mouse/Keyboard Protocol", 1999, http://panda.cs.ndsu.nodak.edu/~achapwes/PICmicro/PS2/ps2.htm.

Letter re: Bang & Olufsen A/S, by David Safran, Nixon Peabody, LLP, May 21, 2004.

Marriott et al., U.S. Appl. No. 10/722,948, filed Nov. 25, 2003.

Photographs of Innovations 2000 Best of Show award presented at the 2000 International CES Innovations 2000 Design & Engineering Showcase, 1 pg.

Sylvania, "Intellivision® Intelligent Televison Master Component Service Manual," pp. 1, 2 and 8, 1979.

* cited by examiner

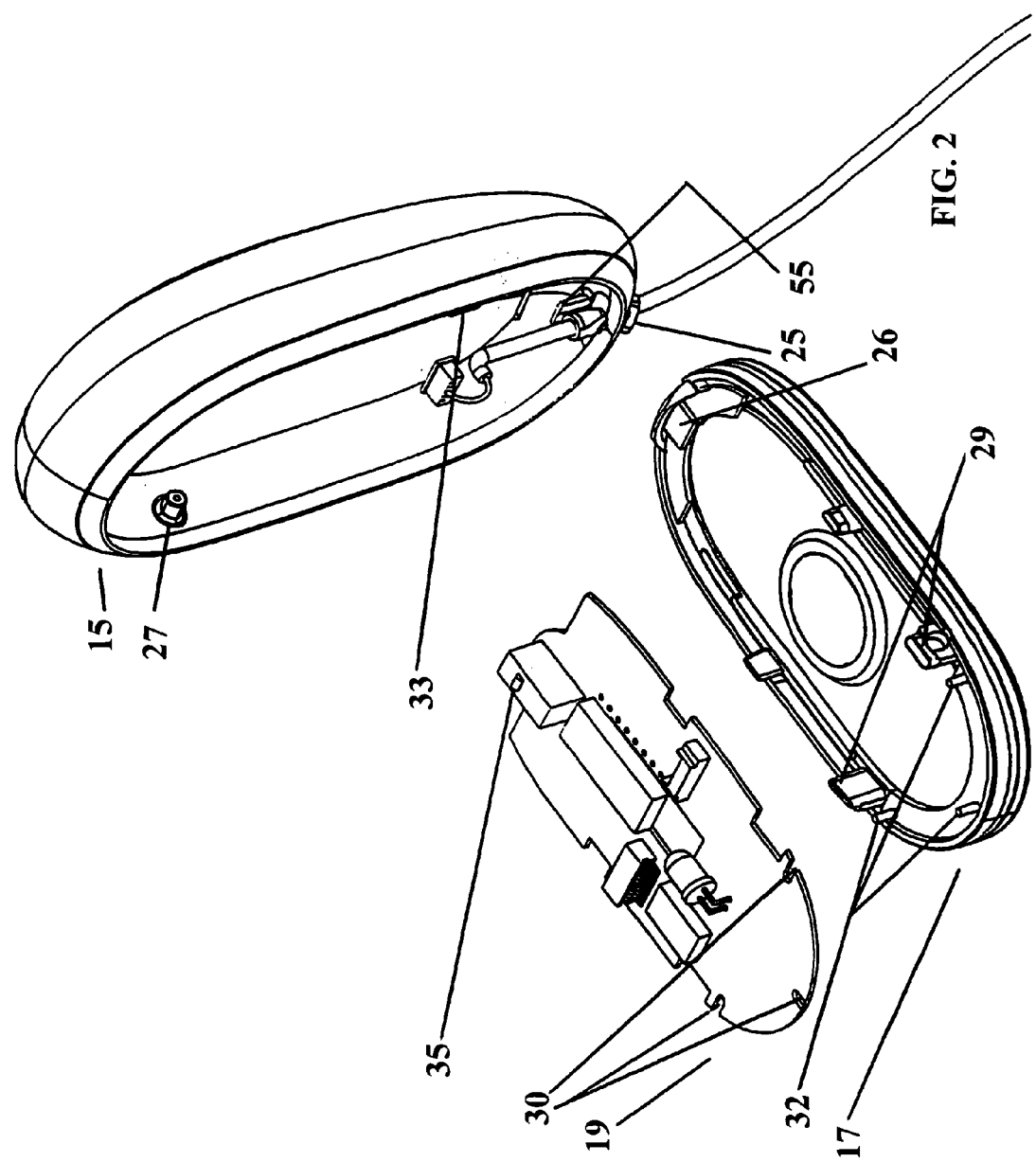

CURSOR CONTROL DEVICE HAVING AN INTEGRAL TOP MEMBER

This is a Continuation application of prior application Ser. No. 09/482,152 filed on Jan. 12, 2000, now U.S. Pat. No. 6,373,470 the disclosure of which is incorporated herein by reference.

CROSS-REFERENCE TO RELATED APPLICATION

This patent application is related to a co-pending application filed by Abraham Farag et al., which is entitled "COMPUTER MOUSE HAVING A CLICKING FORCE ADJUSTMENT FEATURE" and which was filed concurrently with this patent application.

TECHNICAL FIELD

The present invention generally related to cursor control devices for input to a computer system. In particular, the present invention relates to a computer mouse that has no mechanical switches configured in the form of buttons disposed on and flush with the mouse surface for data selection and command execution.

BACKGROUND ART & THE INVENTION SUMMARY

Cursor control devices are known to take a number of forms, which include track balls, joy sticks and the well-known computer mice. A computer mouse is currently a very common and useful input device especially in the computer graphics environment. It usually includes a mouse housing having a captured ball or sphere, a portion of which extends from the interior of the mouse housing. The mouse is moved over a generally flat surface, with the ball in contact with the surface so that the ball rolls over the surface defining the direction of the mouse movement across the surface. The ball movement in turn generates two-dimensional data input for computer cursor control, which is visible on the screen or monitor of the computer. A typical computer mouse may also be implemented without a captured ball. Instead of a ball, optical electronics may be used for generating cursor control signals. Regardless, a computer mouse for a Macintosh® computer manufactured and sold by Apple Computer, Inc. typically has an electro-mechanical switch configured in the form of a clicking button disposed on and flush with the top surface of the mouse. This mechanical clicking button is used for a number of functions such as for data selection and command execution. For example, a computer user moves the mouse on a pad or a tabletop to cause a corresponding movement of the monitor cursor to a displayed application icon. A subsequent single- or double-click finger action (depending on the icon type) on the button of the mouse sends an application execution signal to the computer.

There are various forms of a mechanical button on a mouse. Regardless of shapes and configuration, any typical and existing button is disposed near the top and front portion of the mouse where it is easily accessible to user fingers. In practice, the palm of a computer user would typically cover the top and back portion of the mouse, whereas at least one of the user fingers would naturally lie over the mechanical button located near the top and front portion of the mouse. It is and has been a convenient configuration for many, however, it presents great inconvenience to those who have very large hands or who have very small hands or those who have finger deformity whether by birth or by accidents. When the hands are very large, user fingers need to bend over in order to reach the button; when the hands are very small, user fingers need to stretch out in order to reach the button. None of which presents a comfortable position for these users. Furthermore, if there is any finger deformity involved, then there would be even greater difficulty in activating the mouse button for purposes such as data selection and command execution.

Therefore, it is desirable to provide an electro-mechanical switch preferably in the form of a button for a mouse configured in an improved manner to provide convenience and comfort for users. These users include those having very large hands, those having very small hands and those having the ill fortunes to suffer from finger deformity.

It is an object of the present invention to provide an improved computer mouse that has a mouse housing for containing electronics that generates cursor control signals. This housing includes a base member configured primarily to make moving contact with the surface of a computer pad or a table. This housing further includes an integral top member mechanically coupled to the base member to encase the electronics. The top member is an integrated piece having no separate mechanical button disposed on the top member. In addition, at least the back portion of the top member has an external contour that substantially conforms to the contour of the palm-side surface of the hand, when the hand is in a relaxed, neutral condition, with the palm-side surface generally downwardly and horizontally disposed. For data selection and command execution, the top member and the base member of the mouse are coupled and engaged in a manner that the entire top member serves as a button for activating an internal electronic switch to register palm clicking as an input to the electronics. Such palm clicking action can be easily effected by light wrist action. For example, one aspect of the present invention includes that the top member in one integral piece is continually biased toward a first position in a direction generally away from the base member. To generate a clicking action, the top member is being pushed down toward the base member to a second position by the palm-side surface of the user via wrist action. This aspect of the invention enables clicking action including single-click, double-click and click-and-drag features. Advantageously, in practice, the present invention removes the awkwardness and discomfort for those large-handed, small-handed and deformed-handed users. All users may now comfortably select data or execute commands by simple and light wrist action.

BRIEF DESCRIPTION OF THE DRAWINGS

The above advantages of our invention will no doubt become apparent upon a reading of the following descriptions and a study of the two figures of the drawing.

FIG. 2 is an another simplified and "de-coupled" view of the computer mouse illustrating implementing features of the computer mouse in accordance with the present invention.

DETAILED DESCRIPTION OF THE PREFERRED EMBODIMENTS

Figure 1:
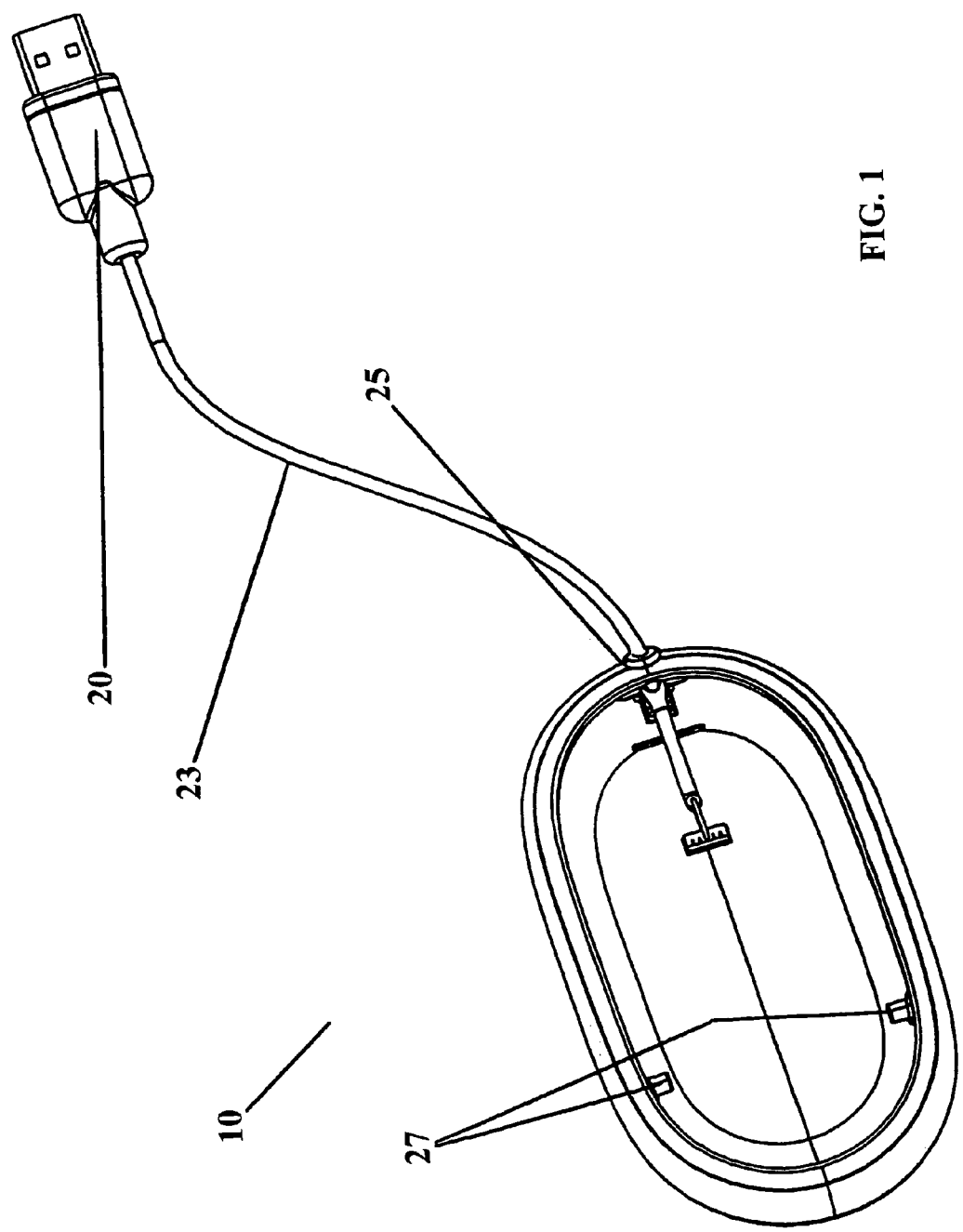
FIG. 1 is a simplified view of a computer mouse in accordance with the present invention.

With today's advances in computer mouse technology, the electro-mechanical switch designs for data selection and command execution generally do not require the rendering of fully detailed implementation diagrams. The definition of mechanical and electronic functionality allows those skilled in the art to design the desired computer mouse implementations. Accordingly, functionality will be described in detail with the accompanying drawings. Those of ordinary skill in the art, once given the following descriptions of the various functions to be carried out by the present invention will be able to implement the necessary mechanical and electrical arrangements in suitable technologies without undue experimentation.

Referring now to FIG. 1 and FIG. 2, two simplified views of a computer mouse 10 in accordance with the present invention are provided to illustrate its various implementation features. This computer mouse 10 includes a top member 15, a base member 17 and a PCB member 19. The top member 15 and the base member 17 coupling together form the housing of the computer mouse 10. Preferably, at least a major portion of the housing is made of translucent material so that electronics internal to the mouse 10 is at least partially visible externally. FIG. 1 and FIG. 2 are simplified in that not all of the internal structures of the housing are illustrated for purpose of clarity. An electrical connector 20, preferably a USB connector, connects the computer mouse 10 to a computer system (not shown). And a cable 23 couples the electrical connector 20 to the internal electronics that is mounted on the PCB member 19 through a front portion 25 of the top member 15. The PCB member 19 has indents 30, and they engage with corresponding extruding members 32 extending upward from the base member 17 to enable the PCB member 19 to be snuggly seated on the base member 17.

FIG. 1 again in a simplified manner, shows location of two internal pivots 27 of the top member 15 relative to the entire computer mouse 10. FIG. 2, on the other hand, shows only one internal pivot 27 (simplified). However, FIG. 2 further shows two snap mechanisms 29 disposed on the base member 17 appropriately configured to matingly engage the two internal pivots 27. Such engagement results in the formation of the housing of the computer mouse 10. A biasing spring pad 26 (spring mechanism not fully shown) on the base member 17 near the front portion 25 of the top member 15 is biased and configured in a manner to push the top member 15 in a direction away from the base member 17 to a first "un-clicked" position. This position may be defined and delimited by the configuration and action of the pivots 27 and snaps 29. As a user pushes down on the top member 15 in its entirety to click for data selection or command execution, an elongated member 33 engages an electrical switch 35 to effect a mouse click action. The elongated member 33 is located on the inside of the top member 15. During the clicking action, it 33 is being pushed against the electrical switch 35 mounted on the PCB member 19 to a second "clicking" position.

While the present invention has been described in terms of preferred embodiments, it is contemplated that persons reading the foregoing detailed description and studying the drawing will realize various alterations and modifications for this invention. It is therefore intended that the following appended claims be interpreted as including all such alterations and modifications as fall within the true spirit and scope of the present invention.

We claim:

1. A hand operated computer mouse, comprising:
a base member; and
an integral top member formed from a single integral piece and having an external contour for receiving a user's hand for manipulation of the hand operated computer mouse, the integral top member cooperating with the base member to form a housing of the hand operated computer mouse, the base member and integral top member working together to encase internal components of the hand operated computer mouse, the base member forming the bottom wall of the housing, the integral top member forming the entire top and side walls of the housing, the integral top member moving relative to the base member to provide a user input action, the integral top member being movably coupled to the base member, the integral top member being capable of moving between a first position, placing the integral top member away from the base member and a second position, placing the integral top member towards the base member.

2. The mouse as recited in claim 1 wherein the internal components include electronics associated with moving a cursor on a display.

3. The mouse as recited in claim 2 wherein the base member carries a mechanism for generating cursor control signals when the mouse is moved about a surface via a user's hand.

4. The input device as recited in claim 3 wherein the mechanism is a trackball.

5. The input device as recited in claim 3 wherein the mechanism is an optical sensing circuit.

6. The mouse as recited in claim 1 wherein the base member is configured to make moving contact with a surface.

7. The mouse as recited in claim 1 wherein the user input action is implemented by moving the integral top member to the second position.

8. The mouse as recited in claim 1 further including a biasing spring pad for biasing the integral top member in the first position.

9. The mouse as recited in claim 1 wherein the integral top member is pivotally coupled to the base member.

10. The mouse as recited in claim 9 wherein the integral top member includes a pair of pivots, and wherein the base member includes a pair of snap mechanisms that mate with the pair of pivots.

11. The mouse as recited in claim 1 wherein an electronic switch is coupled to the base member, and wherein the integral top member includes an elongated member for engaging the electronic switch.

12. The mouse as recited in claim 1 wherein the integral top member has no separate mechanical buttons disposed thereon.

13. The mouse as recited in claim 1 wherein at least a back portion of the integral top member has an external contour that substantially conforms to the contour of the palm-side surface of the hand.

14. A handheld computer mouse having a mouse housing for containing mouse electronics, the handheld computer mouse comprising:
a bottom member configured to make moving contact with a surface;
a top member mechanically coupled with the base member to form the mouse housing and to encase said mouse electronics, the top member of the mouse housing being configured to be grasped and manipulated by a hand of a user, the top member being formed from a single integral piece and defining the entire top surface of the mouse housing, the top member moving relative to the bottom member between a first position, placing the top member away from the bottom member and a second position, placing the top member towards the bottom member, so as to implement a clicking action, the entire top member serving as a movable button for implementing the clicking action; and an electronic switch fully contained inside the mouse housing such that the electronic switch is protected and hidden from view, the electronic switch being activated by said clicking action so as to perform an onscreen action.

15. The computer mouse as recited in claim 14 further comprising a mechanism for generating cursor control signals, the mechanism being carried by the bottom member.

16. The computer mouse as recited in claim 14 wherein the mechanism is a trackball or optical electronics.

17. A handheld computer mouse, comprising:

a base member; and a top member formed from a single piece having no separate mechanical buttons disposed thereon, the top member cooperating with the base member to form a housing of the handheld computer mousse that substantially encloses internal components of the handheld computer mouse, the top member forming the top and side surfaces of the housing and being configured for placement inside a user's hand, the base member forming the bottom surface of the housing and being configured for contact with a support surface, the top member moving relative to the base member to provide a clicking action, the entire top member serving as a button for actuating an internal electronic switch configured to register the clicking action as an input to the electronics of the handheld computer mouse.

18. A computer mouse having a mouse housing for containing electronics that at least generate cursor control signals, the mouse housing comprising:

a base member configured to make moving contact with a surface;

an integral top member formed from one piece and mechanically coupled to the base member, the integral top member cooperating with the base member to fully encase the electronics disposed therein, the integral top member forming the entire top and side surfaces of the mouse housing, the base member forming the bottom surface of the mouse housing, the integral top member and the base member being coupled and engaged in a manner that allows the integral top member to serve as the only button for performing a mouse clicking action, the integral top member during the clicking action activating an internal actuator that registers clicking action as an input to the electronics.

19. The mouse as recited in claim 10 wherein the pivot and snap mechanisms are in an opposed relationship in the back of the input device, the pivot and snap mechanisms providing an axis around which the integral top member rotates during the clicking action.

20. A computer mouse having a mouse housing for fully containing mouse electronics, said mouse electronics being configured to provide mouse movement information and button click information, said computer mouse comprising:

a base member configured to make moving contact with a surface, the base member carrying a tracking mechanism for acquiring mouse movement information when the mouse is moved about a surface, and an internal electronic actuator for acquiring button click information; and a movable outer shell cooperating with the base member to fully encase the electronics disposed therein, the movable outer shell being a single integrated piece that forms the entire grippable surface for manipulating the mouse with a hand, the movable outer shell pivoting relative to the base member so as to provide a button clicking action that activates the internal electronic actuator carried by the base housing member.

21. The mouse as recited in claim 20 wherein the movable outer shell forms the entire top and side surfaces of the mouse housing.

22. The mouse as recited in claim 20 wherein the outer shell is pivotally coupled to the base member via a pair of pivots disposed on opposite sides of the mouse, the pivots providing an axis around which the outer shell pivots during the clicking action.

23. The mouse as recited in claim 22 wherein the pivots are located on the right and left sides of the mouse in a back portion of the mouse such that the front portion of the outer shell tilts forward.

24. The mouse as recited in claim 20 wherein the outer shell is made from a translucent material.

25. The mouse as recited in claim 20 wherein the clicking action is performed by a wrist action.

26. The mouse as recited in claim 20 wherein outer shell is externally contoured to conform to the contour of a palm side surface of a user's hand when the hand is in a relaxed neutral condition.

* * * * *

UNITED STATES PATENT AND TRADEMARK OFFICE
CERTIFICATE OF CORRECTION

| | | |
|---|---|---|
| PATENT NO. | : 7,119,792 B1 | Page 1 of 1 |
| APPLICATION NO. | : 10/060712 | |
| DATED | : October 10, 2006 | |
| INVENTOR(S) | : Andre et al. | |

It is certified that error appears in the above-identified patent and that said Letters Patent is hereby corrected as shown below:

Column 1, line 20, change "related" to --relates--.

In line 6 of claim 17 (column 5, line 19) change "mousse" to --mouse--.

Signed and Sealed this

Twenty-eighth Day of August, 2007

JON W. DUDAS
*Director of the United States Patent and Trademark Office*